US011109095B2

(12) United States Patent
Chen et al.

(10) Patent No.: US 11,109,095 B2
(45) Date of Patent: Aug. 31, 2021

(54) AUTOMATIC ACTIVATION OF CLOSED CAPTIONING FOR LOW VOLUME PERIODS

(71) Applicant: ARRIS Enterprises LLC, Suwanee, GA (US)

(72) Inventors: Yuan Chen, Shanghai (CN); Peng Liu, Fullerton (AU)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/552,651

(22) PCT Filed: Dec. 21, 2016

(86) PCT No.: PCT/CN2016/111283
§ 371 (c)(1),
(2) Date: Aug. 22, 2017

(87) PCT Pub. No.: WO2018/112789
PCT Pub. Date: Jun. 28, 2018

(65) Prior Publication Data
US 2019/0306563 A1    Oct. 3, 2019

(51) Int. Cl.
H04H 60/32    (2008.01)
H04N 21/439    (2011.01)
(Continued)

(52) U.S. Cl.
CPC ......... H04N 21/4394 (2013.01); G10L 25/48 (2013.01); H04N 21/431 (2013.01);
(Continued)

(58) Field of Classification Search
CPC ............. H04N 21/4394; H04N 21/442; H04N 21/4852; H04N 21/4884
See application file for complete search history.

(56) References Cited

U.S. PATENT DOCUMENTS 8,977,974 B2    3/2015 Kraut
9,852,773 B1 *  12/2017 Salvador ............... G11B 27/22
(Continued)

FOREIGN PATENT DOCUMENTS

CN    1581282 A    2/2005
CN    1741596 A    3/2006
(Continued)

OTHER PUBLICATIONS

PCT International Search Report & Written Opinion, RE: Application No. PCT/CN2016/111286, dated Sep. 26, 2017.

Primary Examiner — Gigi L Dubasky
(74) Attorney, Agent, or Firm — Buchanan, Ingersoll & Rooney PC

(57) ABSTRACT

A method and apparatus for monitoring volume level associated with a video stream to determine when the volume level is below an activation threshold (level that may be difficult for a viewer to hear) and automatically activating the closed captioning at that point. The activation threshold may be configurable based on viewer preferences and may be dynamically generated based on the monitored volume level for the video stream. The closed captioning may be de-activated when the volume level exceeds a de-activation threshold (may be configurable and may be dynamically generated). The automatic activation/de-activation of the closed captioning may be performed by a video processor included in a set top box or a television. The volume level may be monitored by the video processor or externally by a volume monitoring device. The text of the closed captioning may be monitored for words associated with a low volume level.

12 Claims, 9 Drawing Sheets

(51) Int. Cl.
    *G10L 25/48* (2013.01)
    *H04N 21/442* (2011.01)
    *H04N 21/485* (2011.01)
    *H04N 21/488* (2011.01)
    *H04N 21/431* (2011.01)

(52) U.S. Cl.
    CPC ......... *H04N 21/439* (2013.01); *H04N 21/442* (2013.01); *H04N 21/488* (2013.01); *H04N 21/4852* (2013.01); *H04N 21/4884* (2013.01)

(56) References Cited

U.S. PATENT DOCUMENTS

| | | | | |
|---|---|---|---|---|
| 2002/0154246 A1* | 10/2002 | Hawkins | ................. | H04N 5/60 348/465 |
| 2006/0069548 A1 | 3/2006 | Matsuura | | |
| 2010/0225808 A1* | 9/2010 | Mears | ................ | H04N 5/44513 348/468 |
| 2014/0184905 A1* | 7/2014 | Mountain | .......... | H04N 21/4394 348/384.1 |
| 2016/0014476 A1* | 1/2016 | Caliendo, Jr. | ...... | H04N 21/4396 725/32 |
| 2016/0100267 A1* | 4/2016 | Gao | ................. | H04M 1/72558 381/56 |
| 2016/0330396 A1* | 11/2016 | Garcia Navarro | ..... | H04N 5/445 |
| 2017/0125019 A1* | 5/2017 | Ganesan | ............ | H04W 64/006 |
| 2017/0134821 A1* | 5/2017 | D'Amelio | ......... | H04N 21/4884 |
| 2017/0289486 A1* | 10/2017 | Stroffolino | ......... | H04N 5/44513 |
| 2018/0027189 A1* | 1/2018 | Feldman | ................ | H04S 7/302 348/468 |

FOREIGN PATENT DOCUMENTS

| | | | |
|---|---|---|---|
| CN | 105323648 A | | 2/2016 |
| EP | 1816860 A1 | | 8/2007 |
| JP | 2012134931 A | * | 7/2012 |
| JP | 2012134931 A | | 7/2012 |

* cited by examiner

| # | Volume Level | Total | Avg | Rolling Tot (5) | Rolling Avg (5) | High Level | Low Level | Std Dev | Diff Avg | Diff Prev | Diff % Prev |
|---|---|---|---|---|---|---|---|---|---|---|---|
| 1 | 100 | 100 | 100.0 | | | | | | | | |
| 2 | 110 | 210 | 105.0 | | | | | | | | |
| 3 | 120 | 330 | 110.0 | | | | | | | | |
| 4 | 130 | 460 | 115.0 | | | | | | | | |
| 5 | 120 | 580 | 116.0 | 580 | 116 | 130 | 100 | 11.4 | 4.0 | | |
| 6 | 110 | 690 | 115.0 | 590 | 118 | 130 | 100 | 10.5 | 5.0 | -10 | -7.7% |
| 7 | 100 | 790 | 112.9 | 580 | 116 | 130 | 100 | 11.1 | 12.9 | -10 | -8.3% |
| 8 | 90 | 880 | 110.0 | 550 | 110 | 130 | 90 | 13.1 | 20.0 | -10 | -9.1% |
| 9 | 80 | 960 | 106.7 | 500 | 100 | 130 | 80 | 15.8 | 26.7 | -10 | -10.0% |
| 10 | 80 | 1040 | 104.0 | 460 | 92 | 130 | 80 | 17.1 | 24.0 | -10 | -11.1% |
| 11 | 80 | 1100 | 100.0 | 410 | 82 | 130 | 60 | 21.0 | 40.0 | 0 | 0.0% |
| 12 | 40 | 1140 | 95.0 | 350 | 70 | 130 | 40 | 26.5 | 55.0 | -20 | -25.0% |
| 13 | 20 | 1160 | 89.2 | 280 | 56 | 130 | 20 | 32.8 | 69.2 | -20 | -33.3% |
| 14 | 20 | 1180 | 84.3 | 220 | 44 | 130 | 20 | 36.5 | 64.3 | 0 | 0.0% |
| 15 | 10 | 1190 | 79.3 | 150 | 30 | 130 | 10 | 40.1 | 69.3 | -10 | -50.0% |

FIG. 5

AUTOMATIC ACTIVATION OF CLOSED CAPTIONING FOR LOW VOLUME PERIODS

BACKGROUND

The volume of a video stream may vary between scenes or even within scenes. Some portions of (e.g., scenes within) the video stream may have a volume much lower than the rest of the video stream. It may be difficult to hear speech or dialogue during these portions of the video stream. A scene in which characters are whispering is an example of a scene where the volume associated with the dialogue may be reduced such that it may be hard for a viewer of the video stream to hear. The reduced volume may be especially difficult for viewers with some type of hearing impairment.

Closed captioning provides the ability to display an audio portion of a video stream as text on a display. This provides individuals who are deaf or hard-of-hearing the ability to read the audio portions that they cannot hear while they watch the video stream. Closed captions match the spoken words in the dialogue and may convey background noises and other sounds to the fullest extent possible. Closed captioning information is typically provided along with the video stream. For video streams transmitted to a viewer over a telecommunications network (e.g., cable, satellite, telephony, Internet), the closed captioning information is transmitted as part of the video stream (is encoded with other information as part of the video stream). For video streams contained on a fixed media (e.g., DVDs), the closed captioning information is stored on the media as part of the video stream.

A video processor within a set top box (STB) or a smart television is capable of extracting the closed captioning information from the video stream, processing the closed captioning information to generate the associated text and presenting the text over the video stream on the display (e.g., television) when closed captioning is activated. If closed captioning is activated for a display it provides closed captioning (e.g., text for dialogue) for all dialogue in all programs presented on the display. If closed captioning is not activated it does not provide closed captioning for any dialogue in any programming.

SUMMARY

A method for automatically activating closed captioning for a video stream. The method comprises determining a volume level of an audio stream associated with the video stream. The volume level is compared to an activation threshold. Closed captioning is activated for the video stream if the volume level is below the activation threshold.

A video processor for automatically activating closed captioning for a video stream containing an audio portion and a video portion. The video processor comprises a text generator, an audio decoder, a volume level monitor and a closed captioning activator. The text generator generates text for closed captioning information included in the video stream. The audio decoder decodes the audio portion, the audio portion having a volume level. The volume level monitor monitors the volume level for the audio portion. The closed captioning activator determines if the volume level is less than an activation threshold and, if the volume level is less than the activation threshold, instructs the text generator to provide the text for the closed captioning information with the video portion to a display.

A processor readable storage medium containing processor executable instructions that when executed by a processor cause the processor to automatically activate closed captioning for a video stream. The instructions include causing the processor to determine a volume level of an audio stream associated with the video stream. The volume level is compared to an activation threshold. The closed captioning is activated for the video stream if the volume level is below the activation threshold.

BRIEF DESCRIPTION OF THE DRAWINGS

Various features of the embodiments described in the following detailed description can be more fully appreciated when considered with reference to the accompanying figures, wherein the same numbers refer to the same elements.

FIG. 5 illustrates an example chart of the volume level monitored over a plurality of measurements and parameters calculated with regard to the measurements, according to one embodiment;

DETAILED DESCRIPTION

Figure 1:
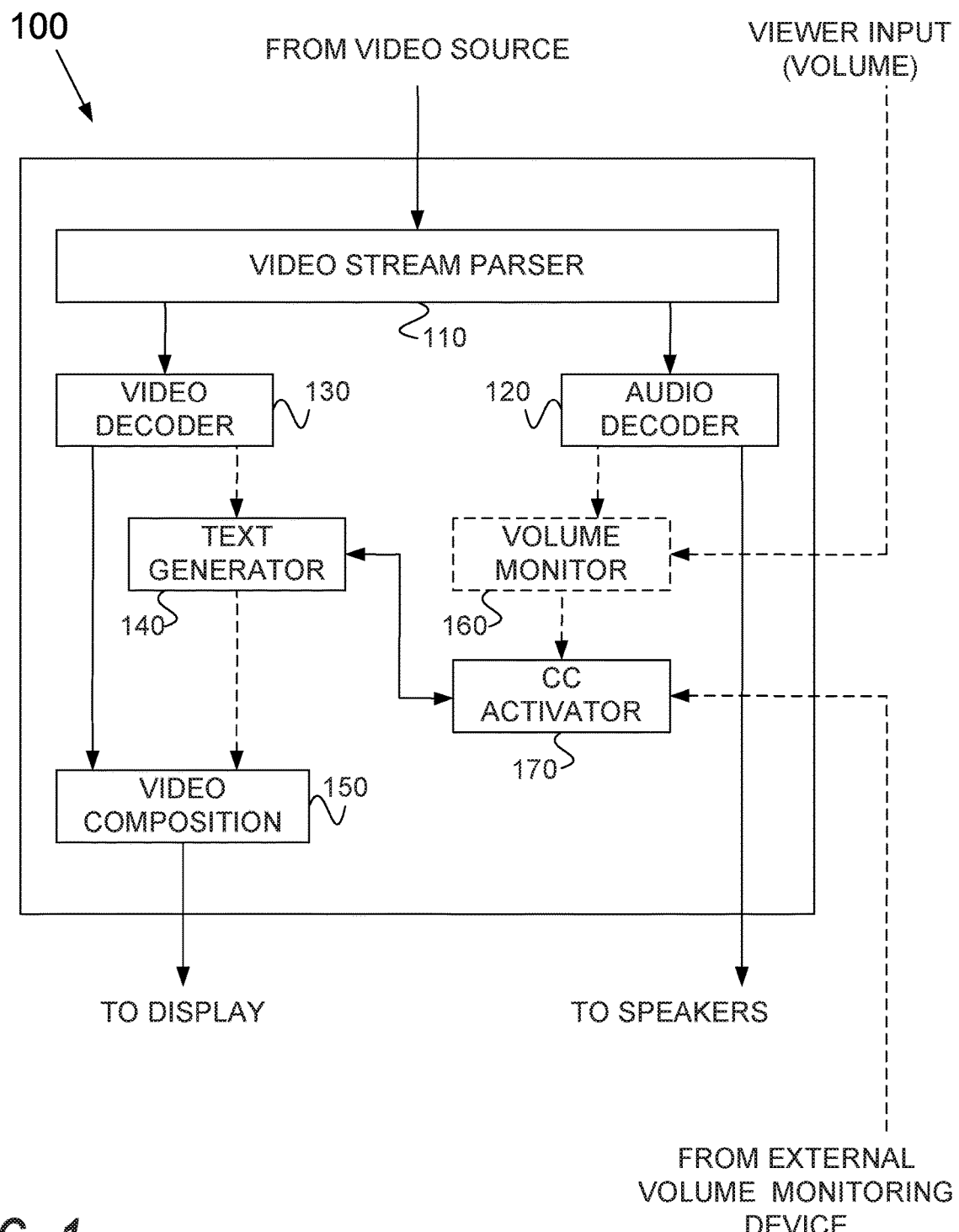
FIG. 1 illustrates a high level functional diagram of a video processor capable of automatically activating closed captioning during low volume periods, according to one embodiment.

FIG. 1 illustrates a high level functional diagram of a video processor 100 utilized to prepare a video stream for presentation on a display (e.g., television) that is capable of automatically activating closed captioning during low volume periods (e.g., periods where the volume level may be difficult for viewers to hear). The low volume periods may include, for example, conversations in the video stream being whispered. The video processor 100 may be contained within a set top box (STB) that acts as an interface between a source of the video stream (e.g., cable network, satellite network, DVD player) and the television. Alternatively, the video processor 100 may be contained within a so-called smart television (television that also has Internet capabilities and would be capable of overlaying the closed captioning information on the video stream). The video processor 100 may process a video stream from any number of sources (e.g., cable network, satellite network, DVD player). The device that the video processor 100 is located in includes an appropriate interface (e.g., HDMI, coaxial, USB) to receive the video stream and then provide it to the video processor 100.

The video processor 100 includes a video stream parser 110, an audio decoder 120, a video decoder 130, a text generator 140, a video composition unit 150, a volume level monitor 160, and a closed captioning activator 170. The video stream parser 110 receives the video stream and parses the video stream into audio and video portions. The audio portion of the video stream is provided to an audio decoder 120 for decoding and processing thereof. For example, the audio decoder 120 is to decode compressed audio signals and process the decoded signals to generate the audio (sounds) associated therewith. The audio may have a volume level associated therewith which may be the basis of the volume level for the audio heard by the viewer.

The audio decoder 120 is to provide the audio to speakers for presentation thereof. The speakers may be part of the display (e.g., television) that the video stream is going to be presented on or may be external speakers. The speakers may adjust (e.g., increase, decrease, mute) the volume level of the audio based on input from the viewer (the volume set by the viewer). The audio may be provided to an amplifier, filter and other components prior to being provided to the speakers. The amplifier, filters and other components may also be capable of modifying the volume level. For example, the amplifiers, speakers or other components may increase or decrease the volume level of the audio or mute the audio.

The video portion of the video stream is provided to the video decoder 130 for decoding and processing thereof. For example, the video decoder 130 is to decode compressed video signals and process the decoded signals to generate the images associated therewith. The closed captioning information may be located within the video signals. The closed captioning information may be provided to the text generator 140. The text generator 140 is to generate text from the closed captioning information for the dialogue and possibly other sounds within the video stream. The text generator 140 may generate the text in a standard format or in a format configured by the viewer. The typical operation of the closed captioning is to either be on all the time or off all the time based on whether a viewer has activated the closed captioning or not. The text generator 140 may only receive or process the closed captioning information or transmit the text if the closed captioning function has been activated (by a viewer or automatically at low volume levels).

The video composition unit 150 receives the images from the video decoder 130, and if activated, the text associated with the closed captioning information from the text generator 140, and prepares the video for presentation on a display. If the closed captioning is activated, the video composition unit 150 overlays the closed captioning text over the video. The location, size and style of the closed captioning text may be configured by the viewer.

The volume level monitor 160 is to monitor the volume level for the audio provided by the audio decoder 120. The volume level of the audio provided by the audio decoder 120 may not be the volume level provided by the display that the video stream is to be presented on since it does not take into account the increases, decreases, or muting of the volume that may occur in the amplifier, filters and/or speakers. According to one embodiment, in order to account for the changes to the volume level made by the amplifier/speaker as a result of viewers input (e.g., volume changes) the viewer input may be provided to the volume level monitor 160. The volume level monitor 160 may utilize the user input to modify the volume level monitored. For example, if the viewer mutes the volume, the volume level monitor 160 may zero out the volume level.

When the closed captioning is not activated, the closed captioning activator 170 is to compare the volume level to an activation threshold. If the closed captioning activator 170 determines the volume level is below the activation threshold it activates the text generator 140 so that the text associated with the closed captioning information will be generated and provided to the video composition unit 150. According to one embodiment, the volume level needs to be below the activation threshold for a defined parameter (e.g., at least 2 seconds, at least 4 consecutive measurements) before the closed captioning is activated.

The closed captioning activator 170 may have the activation threshold programmed therein (the activation threshold may be static). The static activation threshold may be configurable based on viewer input.

The closed captioning activator 170 may dynamically generate the activation threshold based on the volume level monitored by the volume level monitor 160. The closed captioning activator 170 may capture the volume levels monitored in order to determine parameters associated with the volume level. The parameters may include, but are not limited to, average volume level, standard deviation for the volume level, average volume level for a defined time period (rolling average), rolling standard deviation, range of volume levels (lowest, highest, median, mode) over the defined time period, changes to the volume level between measurements, and quantification of the changes to volume level (e.g., percentage change). The activation threshold may be dynamically generated based on at least some combination of the parameters. For example, the activation threshold may be a percentage of the rolling average volume level, the lowest volume level monitored or some combination thereof. The activation threshold may a combination of a static value and a value determined based on the monitored volume level. The dynamic activation threshold may be configurable based on viewer input.

When the closed captioning is activated, the closed captioning activator 170 is to compare the volume level to a de-activation threshold. If the volume level is above the de-activation threshold, the closed captioning activator 170 is to de-activate the text generator 140 so that the text associated with the closed captioning information will be not be generated and/or provided to the video composition unit 150. According to one embodiment, the volume level needs to be above the de-activation threshold for a defined parameter (e.g., at least 3 seconds, at least 6 consecutive measurements) before the closed captioning is de-activated. The de-activation threshold may be more than (e.g., 5% higher, 10% higher) the activation threshold. Alternatively, the de-activation value may be the same as the activation value. The de-activation value may be static, may be configurable by the viewer, and may be dynamically generated (e.g., based on the activation threshold, based on the volume level monitored).

According to one embodiment, an external volume monitor may be located in close proximity to a viewer to capture an actual volume level for the viewer. The monitored volume level may be provided to the closed captioning activator 170 instead of, or in addition to, the monitored volume level from the volume level monitor 160.

According to one embodiment, the text generator 140 may provide the text associated with the closed captioning information to the closed captioning activator 170. Closed captioning often includes indications regarding what is occurring in the video that can't be captured by presenting just the dialogue. For example, the closed captioning may include captions such as "whispering" or "screaming" to better describe the dialogue. The closed captioning activator 170 may scan the text looking for keyboards (e.g., words, phrases) that may provide an indication that the dialogue is occurring at a reduced level (or the reduced level has ended). Examples of keywords that may indicate a reduced volume level may include, for example, "whispering", "talking softly" or variations thereof.

The closed captioning activator 170 may utilize the presence of these keywords as part of a determination to activate the closed captioning. That is, the scanning of the text for keywords may be utilized along with comparing volume levels to the activation threshold. The presence of the keywords may, for example, increase the likelihood the activation threshold will be crossed. This may be accomplished, for example, by increasing the activation threshold or reducing the period of time the volume level needs to be below the activation threshold.

The video processor 100 is in no way intended to be limited to the illustrated functional blocks. Rather, additional functional blocks can be added, functional blocks can be combined, functional blocks can be removed and/or functional blocks can be modified without departing from the current scope.

The video processor 100 provides the ability for the closed captioning to cycle on and off while a viewer is watching the video stream without the viewer needing to take any action. When the viewer initially turns the display on, the video stream may be presented with no closed captioning. At some point later, a determination may be made that the volume level is low (e.g., individuals whispering) and the closed captioning may be turned on. The closed captioning may remain on until a determination is made that the volume level is no longer considered low (e.g., whispering ends). This enables the viewer (especially a viewer who has some kind of hearing impairment) to follow along with the conversation during a low volume period while not having the closed caption on all the time.

Figure 2:
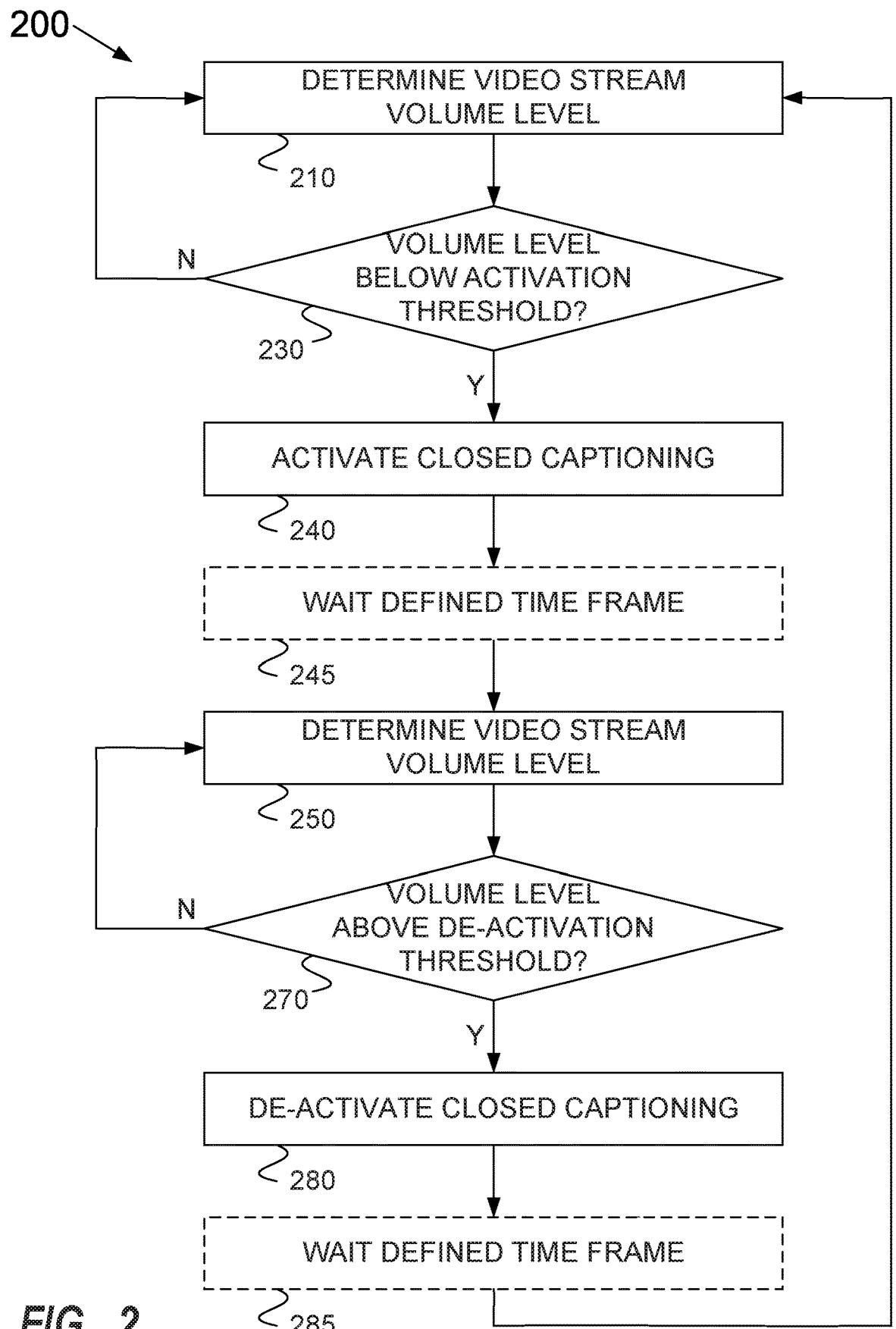
FIG. 2 illustrates an example flow diagram for activating closed captioning based on the volume associated with the video stream, according to one embodiment.

FIG. 2 illustrates an example flow diagram 200 for a video processor automatically activating closed captioning for a video stream based on the volume level associated with the audio for the video stream. Initially, the volume level is determined 210. The volume level may be determined by monitoring the volume level for the audio provided by the audio decoder 120. Alternatively, the volume level may be determined by monitoring the volume level with an external volume monitoring device in close proximity to the viewer.

A determination is then made as to whether the volume level is less than an activation threshold 230. The determination 230 may be made immediately after the volume level becomes less than the activation threshold. Alternatively, the determination 230 may be made based on the volume level being less that the activation threshold for a defined parameter (e.g., 2 seconds, 4 successive measurements). Whether activation is immediate or after a period of time, and what the period of time is, may be configurable parameters. The activation threshold may be a static value that is pre-configured or is configured by the viewer. The activation threshold may be, for example, a percentage or may be a fixed value (e.g., number) as will be discussed in more detail below. The activation threshold may be configurable.

If the volume level is not below the activation threshold (230 No), the process returns to determining the volume level 210. If the volume level is below the activation threshold (230 Yes), the closed captioning is activated 240 (the closed captioning activator 170 activates the text generator 140). Accordingly, the text associated with dialogue and possibly background noises and other sounds associated with the audio of the video stream is presented overlaid on the video stream.

After the closed captioning is activated, the process may optionally be delayed (or de-activated) for a defined period of time (e.g., 3 seconds) 245. The delay 245 is to ensure that the closed captioning stays on for a certain period of time after it is activated and does not rapidly cycle on and off. A rapid cycling on and off may be irritating to a viewer. The length of the delay 245 may be configurable by the viewer. After the delay 245, the volume level of the video stream with closed captioning activated is determined (monitored) 250.

A determination is then made as to whether the volume level is greater than a de-activation threshold 270. It should be noted that the volume level may be monitored 250 during the delay 245 but the volume level monitored during the delay may not be compared to the de-activation threshold 270. The determination 270 may be made immediately after the volume level becomes greater than the de-activation threshold or after the volume level has been greater than the de-activation threshold for a defined parameter (e.g., 3 seconds, 6 successive measurements). Whether de-activation is immediate or after a period of time, and what the period of time is, may be configurable parameters. The de-activation threshold may be a static value that is pre-configured or is configured by the viewer. The de-activation threshold may be, for example, a percentage or may be a fixed value (e.g., number). The de-activation threshold may be higher than the activation threshold to ensure the video stream is no longer in a low volume condition. The de-activation threshold may be configurable.

If the volume level is not above the de-activation threshold (270 No), the process returns to determining the volume level 250. If the volume level is above the de-activation threshold (270 Yes), the closed captioning is de-activated 280. After the closed captioning is de-activated, the process may optionally be delayed (or de-activated) for a defined period of time (e.g., 3 seconds) 285 that may be configurable for the reasons noted above with regard to the delay 245. After the delay 285, the process starts over with the volume level being determined 210. It should be noted that the volume level may be monitored 210 during the delay 285 but the volume level monitored during the delay may not be compared to the activation threshold 230.

The activation threshold may be a value below which the closed caption activator 170 believes would be difficult for a viewer to hear. The activation threshold may be a defined percentage (e.g., 20%) of the maximum volume level that could be provided by the audio decoder 120. The activation threshold may be a defined volume level (e.g., 2 dB). The activation threshold may be configured based on viewer input that may be received using, for example, a remote control or other type of user interface for the STB or television.

For example, if the viewer determines that the closed captioning is not being activated enough during perceived low volume situations they may increase the activation sensitivity which may increase (e.g., raise to 30%, raise to 3 dB) the activation threshold. Raising the activation threshold would result in the measured volume level dipping below the activation threshold more often and therefore the closed captioning being activated more often. Alternatively, if the viewer determines that the closed captioning is being activated too often they may decrease the activation sensitivity which may decrease (e.g., lower to 10%, lower to 1 dB) the activation threshold. Lowering the activation threshold would result in the measured volume level dipping below the activation threshold less often and therefore the closed captioning being activated less often.

It should be noted that when the viewer is configuring (adjusting) the activation level sensitivity they may not know how it is actually being accomplished (not know that the activation threshold level is being adjusted).

Likewise, if the viewer determines that toggling is occurring to often they may adjust the toggling sensitivity which may increase the time associated with the activation/de-activation determinations 230, 270 (e.g., from immediate to some time period), increase the delays 245, 285, and/or increase the de-activation threshold to reduce the toggling. It should be noted that when the viewer is configuring (adjusting) the toggling sensitivity they may not know how it is actually being accomplished (not know that the determinations 230, 270, the delays 245, 285, and/or the de-activation threshold are being increased).

Additionally, if the viewer determines that the closed captioning de-activation is not correctly aligned with the volume level increasing they may adjust the de-activation sensitivity. The adjusting of the de-activation sensitivity may adjust the de-activation threshold. For example, if the viewer determines that the closed captioning is not being de-activated enough during the return from low volume situations then the de-activation threshold may be decreased. Lowering the activation threshold would result in the measured volume level going above the de-activation threshold more often and therefore the closed captioning being de-activated more often. Alternatively, if the viewer determines that the closed captioning is being de-activated too often then the de-activation threshold may be increased. Raising the de-activation threshold would result in the measured volume level going above the de-activation threshold less often and therefore the closed captioning being de-activated less often.

It should be noted that when the viewer is configuring (adjusting) the de-activation level sensitivity they may not know how it is actually being accomplished (not know that the de-activation threshold level is being adjusted).

The process flow 200 is in no way intended to be limited to the illustrated processes. Rather, additional processes can be added, processes can be combined, processes can be deleted, processes can be modified and/or the order of the processes can be modified without departing from the current scope.

According to one embodiment, an activation threshold (and/or a de-activation threshold) may be configured for a plurality of viewers. For example, if three viewers typically watch the display that the video streams are presented on each viewer may have a different setting for activating closed captioning. Viewer one may use a default setting (e.g., 20%, 2 dB), viewer two may have some hearing issues and want the closed captioning activated more often (e.g., 300, 3 dB), and viewer three may desire to have the closed captioning on less often (e.g., 10%, 1 dB). As long as the viewer identifies themselves or is identified based on their actions the correct activation thresholds will be applied.

Figure 3A:
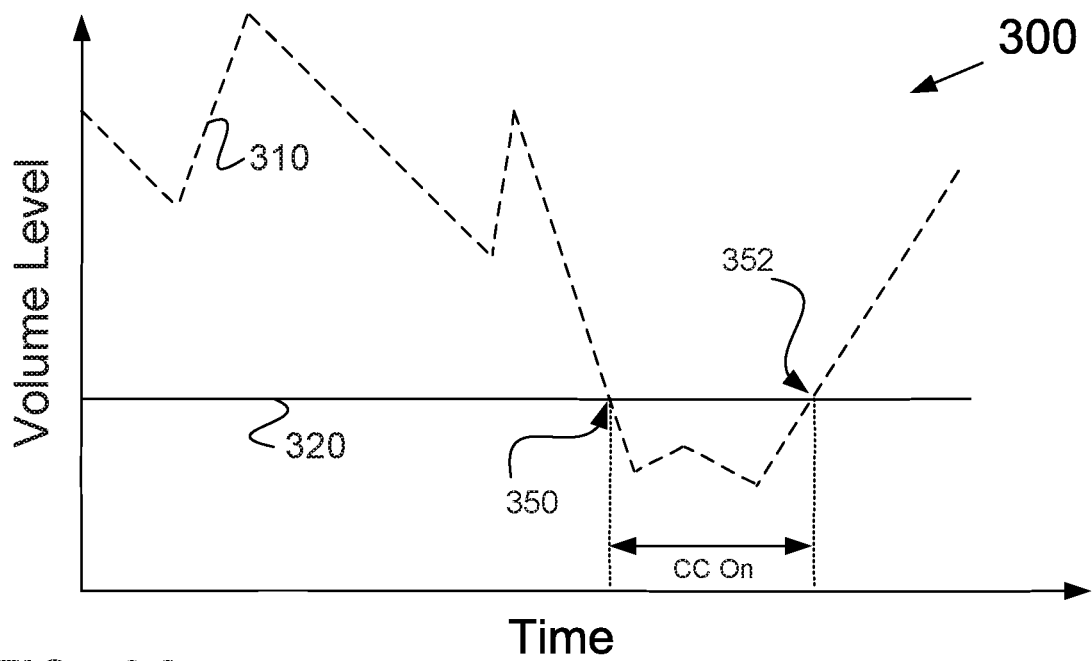
FIGS. 3A-D illustrate example graphs of the monitored volume level versus static closed captioning threshold(s), according to various embodiments.

FIG. 3A illustrates an example graph 300 of a monitored volume level 310 versus a static closed captioning threshold 320 (activation and de-activation thresholds the same). At time 350, the monitored volume level 310 crosses (goes below) the closed captioning threshold 320. Accordingly, the closed captioning may be activated at time 350. At time 352, the monitored volume level 310 crosses (goes above) the closed captioning threshold 320. Accordingly, the closed captioning may be de-activated at time 352. Between time 350 and 352, it is considered to be a low volume period and the closed captioning is on.

Figure 3B:
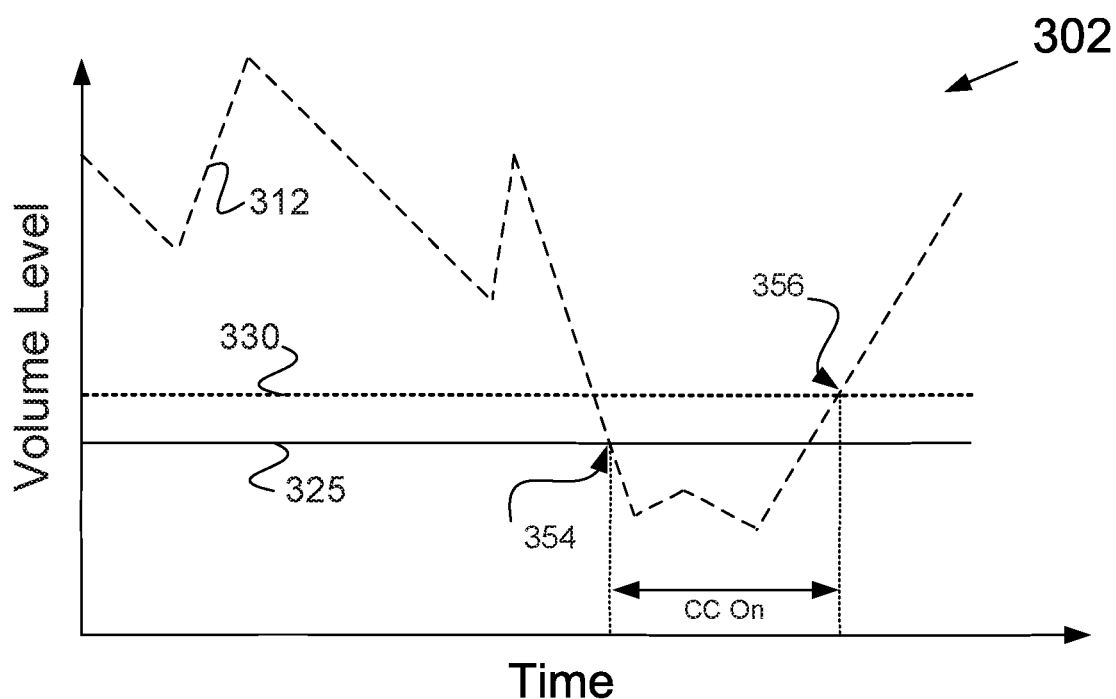

FIG. 3B illustrates an example graph 302 of a monitored volume level 312 versus a static activation threshold 325 and a static de-activation threshold 330. At time 354, the monitored volume level 310 crosses (goes below) the activation threshold 325 and the closed captioning is activated accordingly. At time 356, the monitored volume level 310 crosses (goes above) the de-activation threshold 330 and the closed captioning is de-activated accordingly. Between time 354 and 356, it is considered to be a low volume period and the closed captioning is on.

Figure 3C:
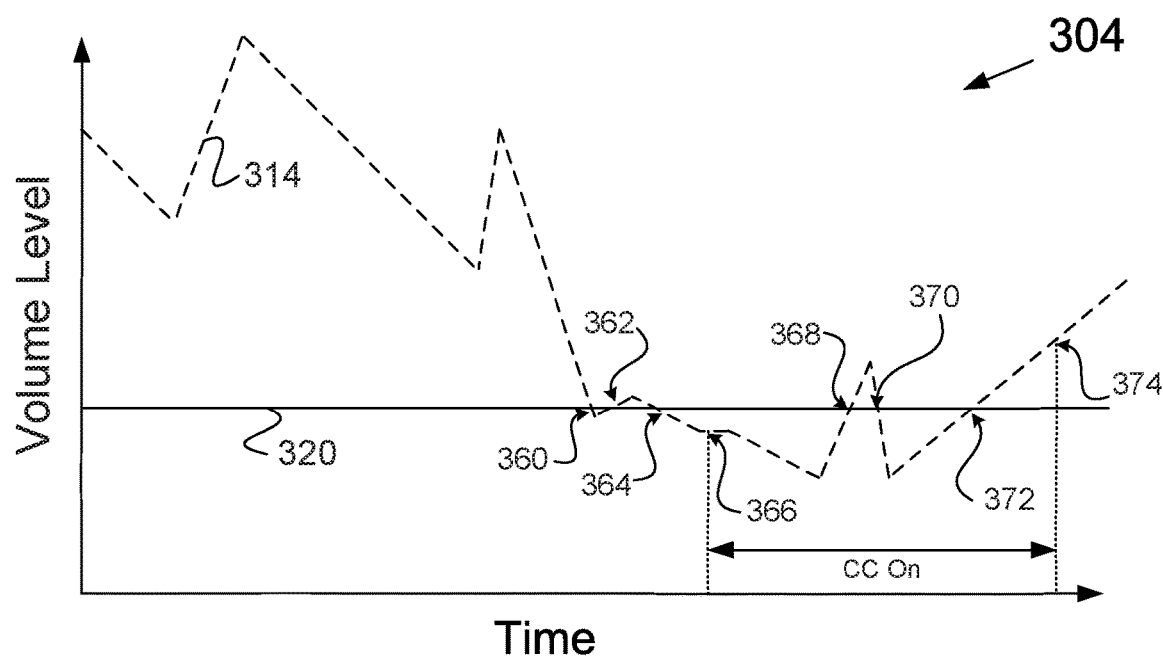

FIG. 3C illustrates an example graph 304 of a monitored volume level 314 versus the static closed captioning threshold 320 (activation and de-activation thresholds the same). The graph 304 illustrates an example where closed captioning is not activated (230 Yes) or de-activated (270 Yes) unless the monitored volume level 314 is below or above the threshold for a defined parameter. At time 360, the monitored volume level 314 crosses (goes below) the closed captioning threshold 320. However, at time 362 the monitored volume level 314 re-crosses (goes above) the closed captioning threshold 320. Since the amount of time that the monitored level 314 is below the closed captioning threshold 320 (between 360 and 362) is very short, it does not meet the defined parameter (e.g., 2 seconds) for activating closed captioning so the closed captioning will remain off.

At time 364, the monitored volume level 314 crosses (goes below) the closed captioning threshold 320 and is still below at time 366 (time between 364 and 366 being the defined parameter for activation) so that the closed captioning is activated at time 366. At time 368, the monitored volume level 314 crosses (goes above) the closed captioning threshold 320 but at time 370 re-crosses (goes below) the closed captioning threshold 320. Since the amount of time that the monitored level 314 is above the closed captioning threshold 320 (between 368 and 370) is very short, it does not meet the defined parameter (e.g., 3 seconds) for de-activating closed captioning so the closed captioning will remain on. At time 372, the monitored volume level 314 crosses (goes above) the closed captioning threshold 320 and is still above at time 374 (time between 372 and 374 being the defined parameter for de-activation) so that the closed captioning is de-activated at time 374. Between time 366 and 374, it is considered to be a low volume period and the closed captioning is activated.

Figure 3D:
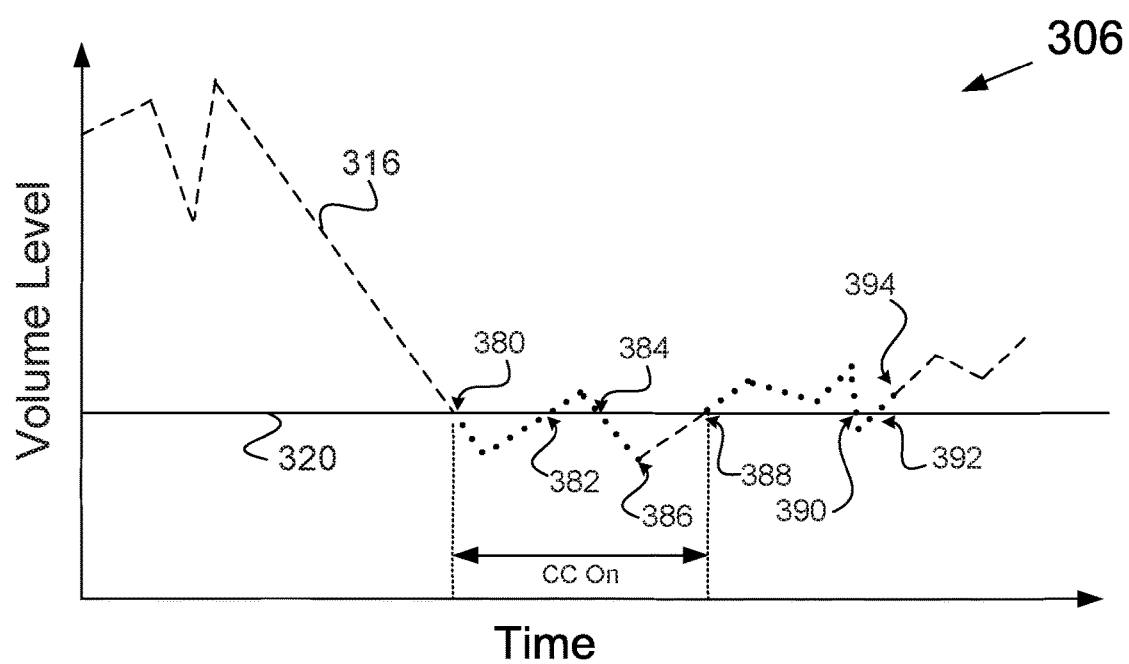

FIG. 3D illustrates an example graph 306 of a monitored volume level 316 versus the static closed captioning threshold 320 (activation and de-activation thresholds the same). The graph 306 illustrates an example where after the closed captioning is activated (240) or de-activated (280), the process has a defined wait period (245, 285) built in. During the wait periods 245, 285, the volume level is either not monitored or is monitored but is not compared to the closed captioning threshold 320 (illustrated as monitoring but not comparing). At time 380, the monitored volume level 316 crosses (goes below) the closed captioning threshold 320 and closed captioning is activated and the wait period begins. The wait period lasts until time 386. During the wait period (between 380 and 386), the monitored volume level 316 crosses above the closed captioning threshold 320 at time 382 and crosses below the closed captioning threshold 320 at time 384. However, since the comparison is not being made during this period there is no change to the closed captioning status (remains active).

At time 388, the monitored volume level 316 crosses above the closed captioning threshold 320 and the closed captioning is de-activated and the wait period begins. Between time 380 and 388, it is considered to be a low volume period and the closed captioning is activated. The wait period lasts until time 394. During the wait period (between 388 and 394), the monitored volume level 316 crosses below the closed captioning threshold 320 at time 390 and crosses above the closed captioning threshold 320 at time 392 with no change to the closed captioning status (remains de-active).

The example graphs of FIGS. 3A-D illustrate various embodiments of an example video processor 100 implementing an example process 200 for automatically activating/de-activating closed captioning functions. It should be noted that the implementations are not limited to the illustrated examples. Rather, the implementations could be combined (e.g., have different thresholds as in FIG. 3B along with delay in activation/de-activation as in FIG. 3C, have delay in activation/de-activation as in FIG. 3C along with wait periods of FIG. 3D) or other implantations could be utilized in place of or in addition to those illustrated.

FIGS. 2 and 3A-D focused on static closed captioning thresholds (activation, de-activation). According to one embodiment, the thresholds may be dynamic. The dynamic thresholds may be determined based on the monitored volume level.

Figure 4:
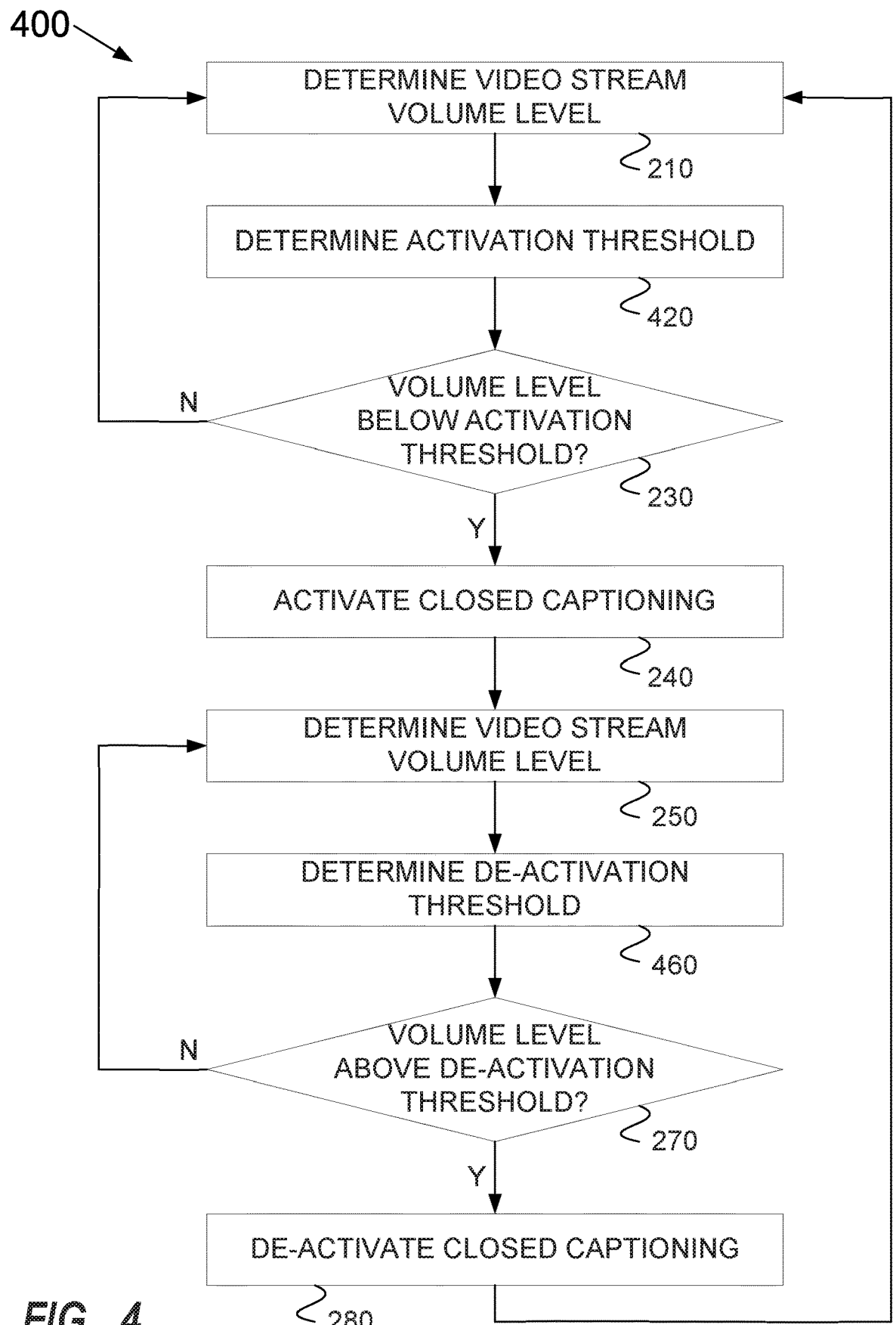
FIG. 4 illustrates an example flow diagram for activating closed captioning based on the volume associated with the video stream, according to one embodiment.

FIG. 4 illustrates an example flow diagram 400 for a video processor automatically activating closed captioning for a video stream based on the volume level associated with the audio for the video stream. The flow diagram 400 is similar to the flow diagram 200 but has added processes related to dynamically determining the closed captioning thresholds. Initially, the volume level is determined 210 by, for example, monitoring the volume level for the audio provided by the audio decoder 120. The activation threshold is then determined 420. The activation threshold may be determined based on the volume levels monitored. For example, the monitored volume levels may be captured and different parameters about the monitored volumes may be determined and/or calculated. The parameters may include, but are not limited to, average volume level, average volume level for a defined time period (rolling average), range of volume levels (lowest, highest, median, mode), standard deviation for the volume level, difference between monitored volume level and the average volume level, and changes to the volume level between measurements (difference, percentage change).

FIG. 5 illustrates an example chart 500 of the volume level monitored over a plurality of measurements (15) and parameters calculated/determined with regard to the measurements. The columns of the chart 500 include measurement number 510, volume level monitored 515, total volume level monitored for all measurements 520, average volume level for all measurements 525, rolling total for last 5 measurements 530, rolling average for last 5 measurements 535, high volume level monitored for all measurements 540, low volume level monitored for all measurements 545, standard deviation for all monitored volume level measurements 550, difference between current monitored volume level and average volume level 555, difference between current monitored volume level and previous monitored volume level 560, and percentage difference between current monitored volume level and previous monitored volume level 565. As illustrated, the columns 530-565 do not start determining and/or calculating the appropriate values until the $5^{th}$ measurement is reached.

It should be noted that the volume levels monitored and the parameters calculated/determined in chart 500 do not have units defined as these numbers are simply used as examples and are not associated with any specific unit. The volume levels could be monitored, for example, in decibels and the monitored values as well as the parameters calculated/determined would be in an appropriate range therefore. The parameters determined/calculated are in no way intended to be limited to the illustrated examples in chart 500.

The activation level may be dynamically generated based on any of the volume level parameters captured in chart 500 or a combination thereof. For example, the activation threshold may calculated as, including but not limited to, a percentage of the average volume level, a percentage of the rolling average volume level, a percentage of the highest volume level monitored, a certain number of standard deviations from the average volume level or some combination thereof. The activation threshold may a combination of a static value and a value determined based on the monitored volume level or parameters related thereto (such as the information captured in chart 500).

Returning to FIG. 4, after the activation threshold is determined 420, a determination is then made as to whether the volume level is less than the activation threshold 230. The determination 230 may be made as soon as the volume level becomes less than the activation threshold. Alternatively, the determination 230 may be made based on the volume level being less that the activation threshold for a defined parameter (e.g., 2 seconds, 4 successive measurements).

If the volume level is not below the activation threshold (230 No), the process returns to determining the volume level 210. If the volume level is below the activation threshold (230 Yes), the closed captioning is activated 240 (the closed captioning activator 170 activates the text generator 140).

Figure 6:
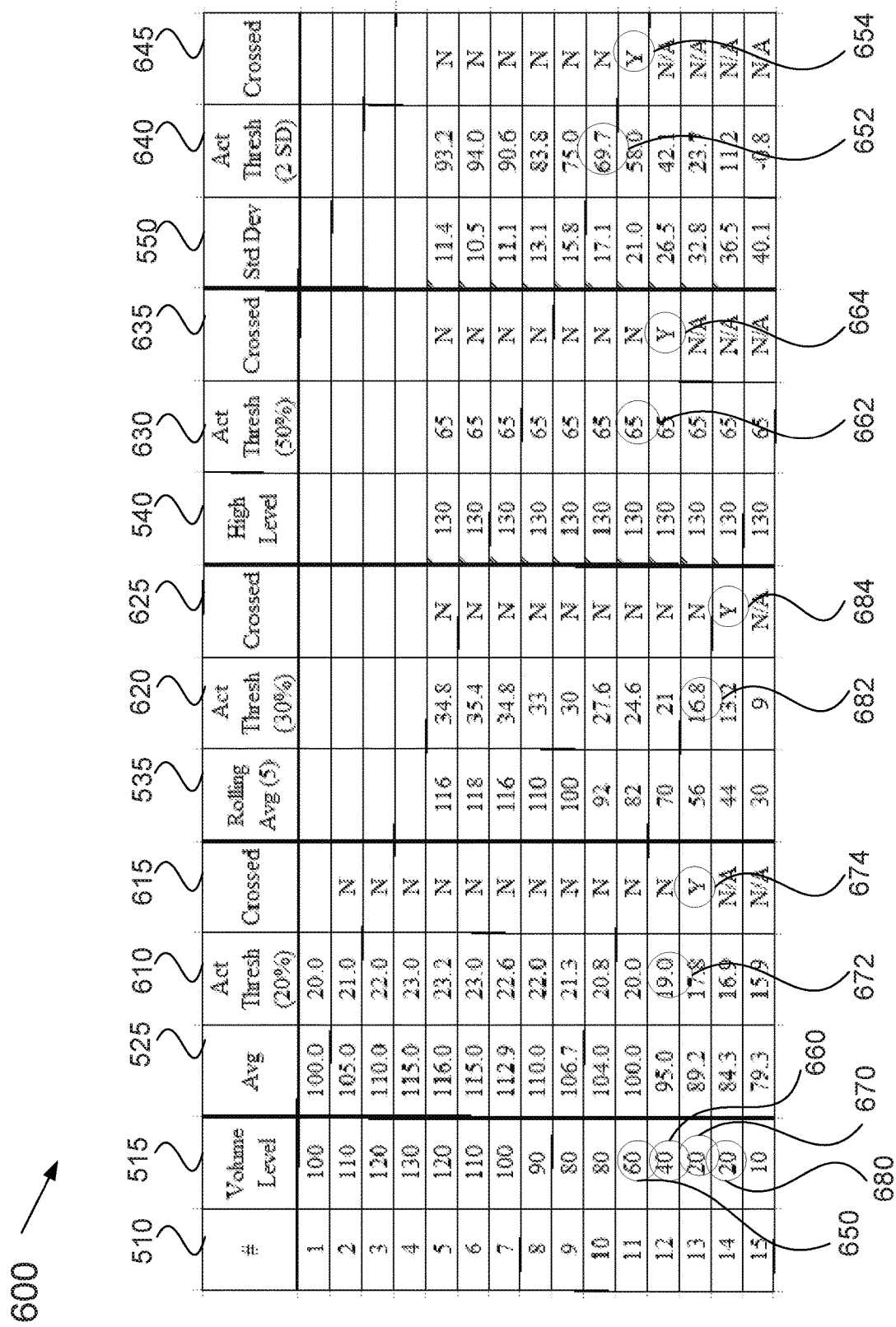
FIG. 6 illustrates an example chart of some of the volume level parameters captured in FIG. 5 utilized to create example activation thresholds and determinations of when the activations thresholds are crossed, according to one embodiment.

FIG. 6 illustrates an example chart 600 of some of the volume level parameters captured in chart 500 utilized to create example activation thresholds and determinations of when the activations thresholds are crossed (monitored volume level goes below). The columns of the chart 600 that are taken from chart 500 include the measurement number 510, the volume level monitored 515, the average volume level for all measurements 525, the rolling average for last 5 measurements 535, the high volume level monitored 540, and the standard deviation 550. Each of the average volume level 525, the rolling average volume level 535, the high volume level monitored 540, and the standard deviation 550 are utilized to generate activation thresholds 610, 620, 630, 640 respectively. The activation threshold 610 is twenty percent (20%) of the average volume level 525. The activation threshold 620 is thirty percent (30%) of the rolling average volume level 535. The activation threshold 630 is fifty percent (50%) of the high volume level monitored 540. The activation threshold 640 is the average volume level minus two (2) standard deviations 550. The activation thresholds 620, 630, 640 are only calculated after the fifth measurement when the associated parameters are determined/calculated as discussed above with respect to FIG. 5.

It should be noted that chart 600 (just like chart 500) does not have units defined as these numbers are simply used as examples and are not associated with any specific unit. The volume levels could be, for example, decibels and the values would be in an appropriate range therefore.

Any of the activation thresholds 610, 620, 630, 640 calculated after a certain measurement (e.g., 5) may be compared to the monitored volume level 515 at a next measurement (e.g., 6). If the monitored volume level 515 is below the appropriate activation threshold 610, 620, 630, 640 the crossing of the threshold may be identified and the closed captioning may be activated. Columns 615, 625, 635 and 645 identify whether the associated activation thresholds 610, 620, 630, 640 have been crossed. The activation of the closed captioning may be based on a single determination that an activation threshold has been crossed (this embodiment is illustrated). Alternatively, the activation may be based on a certain number of successive determinations.

At measurement 11, the monitored volume level 515 is 60 (650) which is below the activation threshold 640 determined after measurement 10 to be 69.7 (652) and accordingly the crossing (going below) thereof 645 is indicated for measurement 11 (654). As illustrated, once the crossing 645 has been indicated (Y) and the closed captioning is activated the crossing is not tracked thereafter until the closed captioning is de-activated and again a determination needs to be made as to whether it should be activated.

At measurement 12, the monitored volume level 515 is 40 (660) which is below the activation threshold 630 determined after measurement 11 to be 65 (662) and accordingly the crossing (going below) thereof 635 is indicated for measurement 12 (664). At measurement 13, the monitored volume level 515 is 20 (670) which is below the activation threshold 610 determined after measurement 12 to be 19 (672) and accordingly the crossing (going below) thereof 615 is indicated for measurement 13 (674). At measurement 14, the monitored volume level 515 is 20 (680) which is below the activation threshold 620 determined after measurement 13 to be 16.8 (682) and accordingly the crossing (going below) thereof 625 is indicated for measurement 14 (684).

As illustrated, the closed captioning may be activated at different times depending on which activation threshold is used. According to one embodiment, the activation of the closed captioning may be based on more than one threshold being crossed. As illustrated, two thresholds are crossed after measurement 12 (thresholds 640 and 630). The activation thresholds are in no way intended to be limited to the illustrated examples in chart 600.

Referring back to FIG. 4, after the closed captioning is activated, the volume level of the video stream with closed captioning activated is determined (monitored) 250. While not illustrated, the process may optionally be delayed (or de-activated) for a defined period of time (e.g., 3 seconds) prior to, or after, the monitoring 250 to ensure that the closed captioning stays on for a certain period of time after it is activated and does not rapidly cycle on and off.

The de-activation threshold is then determined 460. The de-activation threshold may be determined based on the volume levels monitored, parameters determined/calculated about the monitored volume and/or the activation threshold. According to one embodiment, the de-activation threshold may be calculated based on volume levels monitored after the closed captioning is activated. The de-activation threshold may be some amount more than one or more of the parameters determined/calculated for the monitored volume level subsequent to closed captioning activation. The parameters may be the same or similar to the parameters determined/calculated for the activation determination (such as those illustrated in FIG. 5). For example, the de-activation threshold may be 120% of the average monitored volume level after closed captioning activation. The de-activation threshold may be some amount more than the activation threshold.

Once the de-activation threshold is determined, a determination is made as to whether the monitored volume level is greater than the de-activation threshold 270. The determination 270 may be made as soon as the volume level becomes greater than the de-activation threshold or after the volume level has been greater than the de-activation threshold for a defined parameter (e.g., 3 seconds, 6 successive measurements).

If the volume level is not above the de-activation threshold (270 No), the process returns to determining the volume level 250. If the volume level is above the de-activation threshold (270 Yes), the closed captioning is de-activated 280.

After the closed captioning is de-activated, the process starts over with the volume level being determined 210. While not illustrated, the process may optionally be delayed (or de-activated) for a defined period of time (e.g., 3 seconds) prior to, or after, the monitoring 210 to ensure that the closed captioning stays off for a certain period of time after it is de-activated and does not rapidly cycle on and off.

The process flow 400 is in no way intended to be limited to the illustrated processes. Rather, additional processes can be added, processes can be combined, processes can be deleted, processes can be modified and/or the order of the processes can be modified without departing from the current scope.

The dynamic closed captioning thresholds (activation, de-activation) may be configurable by a viewer. The dynamic thresholds may be configured using a remote control or other type of user interface for the STB or television. It should be noted that the viewer may simply be adjusting an activation/de-activation sensitivity and not have any idea how it is being accomplished.

For example, with regard to activation, a higher sensitivity level may equate to more activation and a lower sensitivity level may result in less activation. A higher sensitivity level may change parameters that result in an increase of the activation threshold thus resulting in the potential for the measured volume level dipping below the activation threshold more often and accordingly the closed captioning being activated more often. A lower sensitivity level may change parameters that result in a decrease of the activation threshold thus resulting in the potential for the measured volume level dipping below the activation threshold less often and accordingly the closed captioning being activated less often.

The dynamic activation threshold may be adjusted by, for example, changing the percentage that is applied to an associated parameter. By way of example, increasing the percentage for activation threshold 610 from 20% to 30% (50% increase) would increase the activation threshold by 50% which would likely result in the monitored volume level dipping below the activation threshold more often and accordingly result in an increase in the activation of closed captioning. Conversely, decreasing the percentage for activation threshold 610 from 20% to 10% (50% decrease) would decrease the activation threshold by 50% which would likely result in the monitored volume level dipping below the activation threshold less often and accordingly result in an decrease in the activation of closed captioning.

The dynamic de-activation threshold could be configured in a similar manner. Higher sensitivity may result in changes (e.g., decrease percentage) that decrease the de-activation threshold and likely result in more de-activations and lower sensitivity may result in changes (e.g., increase percentage) that increase the de-activation threshold and likely result in less de-activations.

Figure 7A:
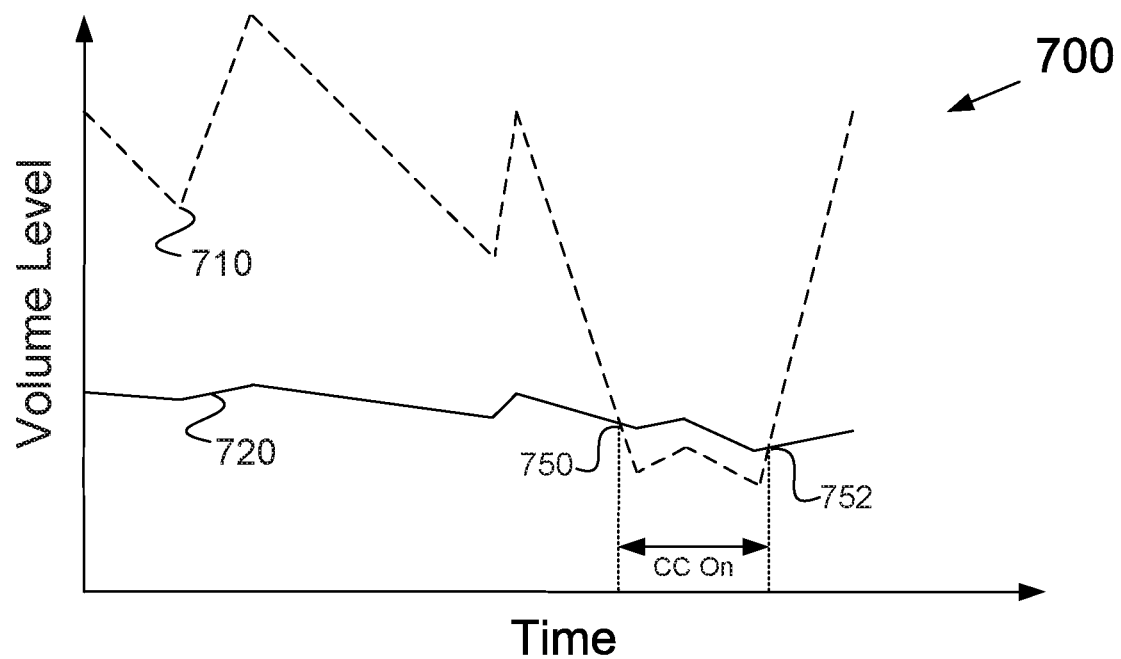
FIGS. 7A-B illustrate example graphs of the monitored volume level versus dynamic closed captioning threshold(s), according to various embodiments.

FIG. 7A illustrates an example graph 700 of a monitored volume level 710 versus a dynamic closed captioning threshold 720 (activation and de-activation thresholds the same). The dynamic closed captioning threshold 720 may be based on parameters calculated/determined about the monitored volume level 710 such as any of those described with respect to the chart 600. At time 750, the monitored volume level 710 crosses (goes below) the dynamic closed captioning threshold 720. Accordingly, the closed captioning may be activated at time 750. At time 752, the monitored volume level 710 crosses (goes above) the dynamic closed captioning threshold 720. Accordingly, the closed captioning may be de-activated at time 752. Between time 750 and 752, it is considered to be a low volume period and the closed captioning is on.

Figure 7B:
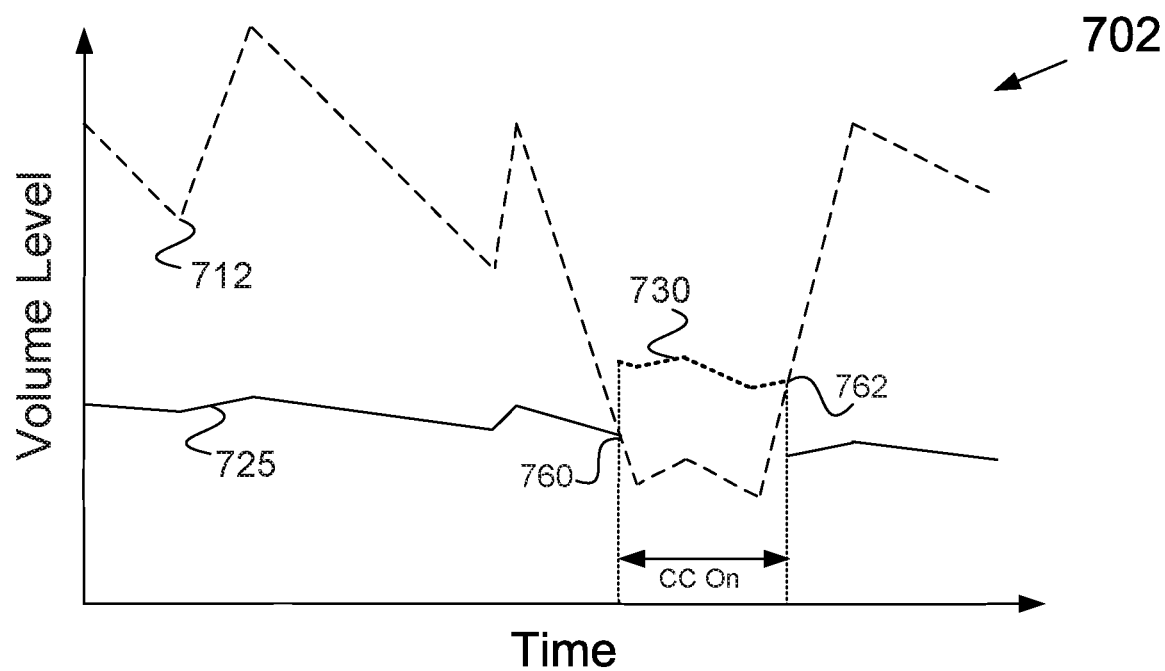

FIG. 7B illustrates an example graph 702 of a monitored volume level 712 versus a dynamic activation threshold 725 and a dynamic de-activation threshold 730. As illustrated, the dynamic activation threshold 725 is only illustrated when the closed captioning is not activated and the dynamic de-activation threshold 730 is only illustrated when the closed captioning is activated. This may be indicative of the times that the thresholds 725, 730 are determined or when they are compared to the monitored volume level 712. The dynamic activation threshold 725 and the dynamic de-activation threshold 730 may be based on parameters calculated/determined about the monitored volume level 712 such as any of those described with respect to the chart 600. The dynamic de-activation threshold 730 may be based on the dynamic activation threshold 725.

At time 760, the monitored volume level 712 crosses (goes below) the dynamic activation threshold 730. Accordingly, the closed captioning may be activated at time 760. Also, the determination of the activation threshold 725 or the comparing of the activation threshold 725 to the monitored volume level 712 may cease at this point. Likewise, the determination of the de-activation threshold 730 or the comparing of the de-activation threshold 730 to the monitored volume level 712 may start at this point. At time 762, the monitored volume level 712 crosses (goes above) the dynamic de-activation threshold 730. Accordingly, the closed captioning may be de-activated at time 762. Also, the determination of the de-activation threshold 730 or the comparing of the de-activation threshold 730 to the monitored volume level 712 may cease at this point. Likewise, the determination of the activation threshold 725 or the comparing of the de-activation threshold 725 to the monitored volume level 712 may start at this point. Between time 760 and 762, it is considered to be a low volume period and the closed captioning is on.

The example graphs of FIGS. 7A-B illustrate various embodiments of an example video processor 100 implementing an example process 400 for automatically activating/de-activating closed captioning functions. It should be noted that the implementations are not limited to the illustrated examples. For example, the implementations could be combined with implementations having a delay in activation/de-activation as in FIG. 3C or having wait periods as in FIG. 3D. Additionally, other implantations could be utilized in place of or in addition to those illustrated.

Instructions or software may be stored on a processor readable storage medium. The instructions or software when executed by the processor may cause the processor to perform the functions described with respect to FIG. 1 and the process flows described with respect to FIGS. 2 and 4. The processor readable storage medium and the processor may be part of the video processor 100.

Figure 8:
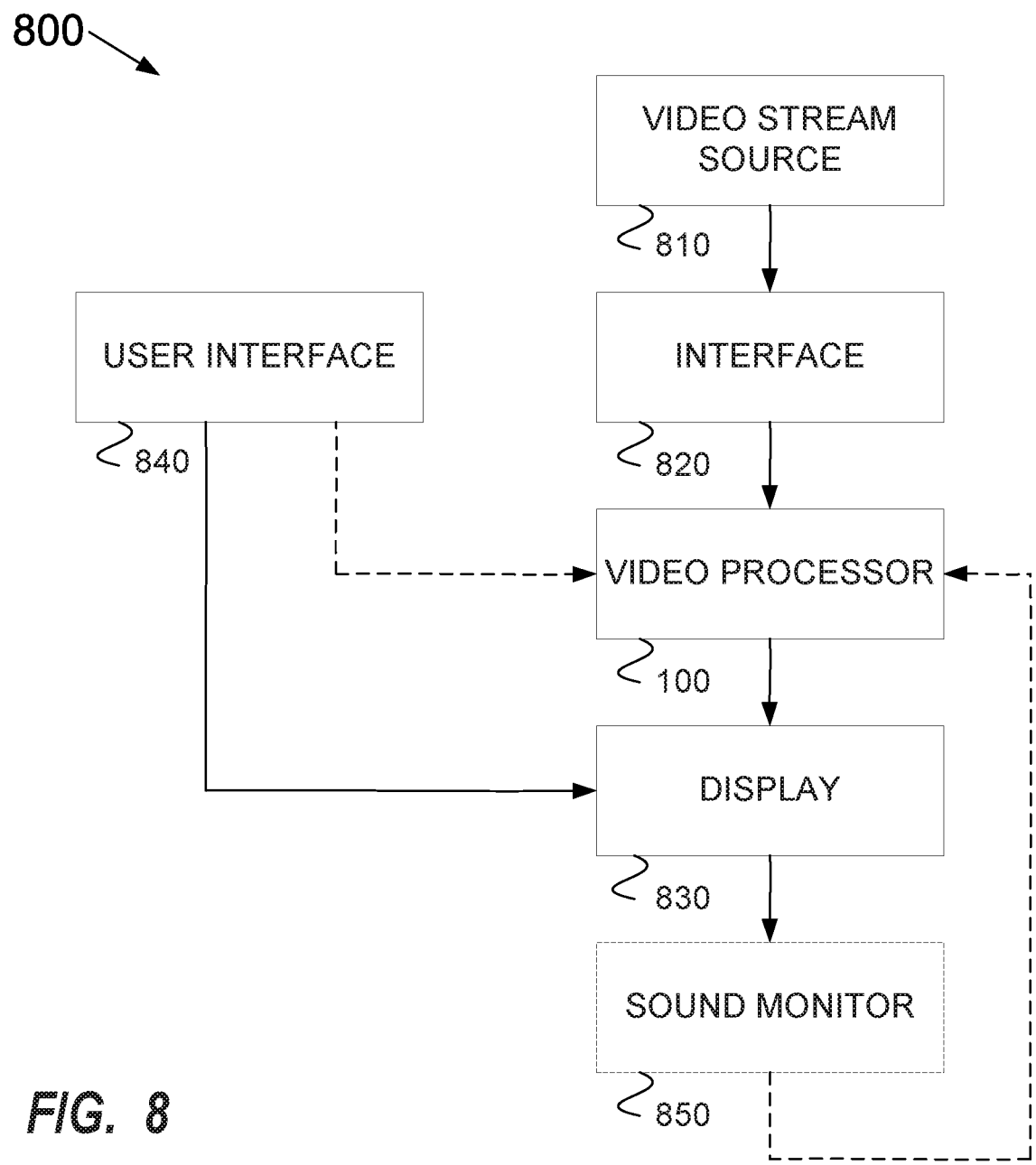
FIG. 8 illustrates a high level block functional diagram of a video processor utilized within a video delivery/presentation system, according to one embodiment.

FIG. 8 illustrates a high level block functional diagram of a video processor 100 utilized within a video delivery/presentation system 800. The video delivery/presentation system 800 includes a video stream source 810, an interface 820, the video processor 100, a display 830 and a user interface 840. Some embodiments may include a sound monitor 850.

The video source 810 may be, for example, a telecommunications network (e.g., cable, satellite, telephony, Internet) or a media player (e.g., DVD player, DVR, computer). The video stream may be received from the video source 810 by the interface 820. The interface 820 may vary based on the source 810. The interface 820 may be as simple as a port that connects to a cable that the video stream is transmitted over and the protocols necessary to receive the video stream thereover. The interface 820 may include multiple ports and associated protocols. The interface 820 may include other components and protocols necessary to perform additional functions, such as, extracting the video stream from the packets it was transmitted within. That is, the interface 820 may be capable of communicating with the specific telecommunications network (e.g., cable, satellite). The interface 820 may include multiple different interfaces, such as an interface to extract the video stream from the packets and an interface to receive the video stream via the cable/port connection. The interface 820 may include included in a STB, a smart television, or both.

The interface 820 may provide the video stream to the video processor 100 for processing as described above. That processing may include determining when to activate/de-activate closed captioning. The determination may be made based on monitoring volume levels and comparing them to thresholds. The video processor 100 may receive input from the user interface 840 related to volume adjustments when making the determination. According to one embodiment, the video processor 100 may scan the closed captioning text for indications that the closed captioning should be activated/de-activated. The video processor 100 may be located in the STB or the television.

The video processor 100 provides the video (with or without closed captioning overlaid) and the audio to the display 830 for presentation thereon. The viewer may utilize the user interface 840 to make changes to the display 830. The changes may include increasing, decreasing or muting the volume, adjusting the color, contrast of other elements associated with the video. The display 830 may be part of the television.

According to one embodiment, a sound monitor 850 is utilized to monitor the volume level that the viewer is hearing and the results thereof may be utilized to activate or de-activate the closed captioning. The sound monitor 850 may provide its determination to the video processor 100.

According to one embodiment, the automatic closed captioning activation is a feature that the viewers may turn on or off.

It should be noted that the various embodiments has been discussed with respect to automatically activating closed captioning when the volume level is determined to be low. The various embodiments could also be utilized when closed captioning is already activated to modify the way the closed captioning is presented to provide the viewer with an indication that the dialogue is occurring at a low volume level (e.g., whispering) to provide them with additional context. The modification to the closed captioning may include, for example, changing the size, font or color of the closed captioning. When the dialogue volume level is no longer consider low, the closed captioning may return to the normal format.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

The invention claimed is:

1. A method for automatically activating closed captioning for a video stream, the method comprising:
 receiving a video stream, the video stream including an audio portion and a video portion;
 decoding the audio portion of the video stream, the audio portion having a volume level;
 determining the volume level of the audio portion to dynamically generate an activation threshold and a deactivation threshold;
 comparing the volume level to the activation threshold; and
 activating the closed captioning for the video stream if the volume level is below the activation threshold for a first defined period of time;
 determining the volume level of the audio portion while the closed captioning is activated;
 comparing the volume level to the de-activation threshold; and
 de-activating the closed captioning for the video stream when the volume level is above the de-activation threshold for a second defined period of time, wherein the de-activation threshold is more than the activation threshold.

2. The method of claim 1, further comprising configuring the activation threshold based on viewer input.

3. The method of claim 1, further comprising determining parameters about the volume level and utilizing at least a subset of the parameters to dynamically determine the activation threshold.

4. The method of claim 1, further comprising configuring the dynamic determination of the activation threshold based on viewer input.

5. The method of claim 1, further comprising configuring the de-activation threshold based on viewer input.

6. The method of claim 1, further comprising scanning text associated with the closed captioning for keywords, wherein the keywords are indicative of dialogue in the video stream being presented at a low volume level.

7. A video processor for automatically activating closed captioning for a video stream containing an audio portion and a video portion, the video processor comprising:
 a text generator which generates text for closed captioning information included in the video stream;
 an audio decoder which decodes the audio portion, wherein the decoded audio portion has a volume level;
 a volume level monitor which monitors the volume level of the audio portion from the audio decoder to dynamically generate an activation threshold and a deactivation threshold; and
 a closed captioning activator which:
  determines the volume level is less than the activation threshold for a first defined period of time and, when the volume level is less than the activation threshold for the first defined period of time, instructs the text generator to provide the text for the closed captioning information with the video portion to a display,
  determines the volume level when the text for the closed captioning information is being provided is more than the de-activation threshold for a second defined period of time, and when the volume level is more than the de-activation threshold for the second defined period of time, instructs the text generator to not provide the text for the closed captioning information with the video stream to the display, wherein the de-activation threshold is more than the activation threshold.

8. The video processor of claim 7, wherein the closed captioning activator further configures the activation threshold based on viewer input.

9. The video processor of claim 7, wherein the closed captioning activator further determines parameters about the volume level and utilizes at least a subset of the parameters to dynamically determine the activation threshold.

10. A processor readable storage medium containing processor executable instructions that when executed by a processor cause the processor to automatically activate closed captioning for a video stream by:
 receiving a video stream, the video stream including an audio portion and a video portion;
 decoding the audio portion of the video stream, the audio portion having a volume level;
 determining the volume level of the audio portion to dynamically generate an activation threshold and a deactivation threshold;
 comparing the volume level to the activation threshold; and
 activating the closed captioning for the video stream if the volume level is below the activation threshold for a first defined period of time;
 determining the volume level of the audio portion while the closed captioning is activated;
 comparing the volume level to the de-activation threshold, wherein the de-activation threshold is more than the activation threshold; and
 de-activating the closed captioning for the video stream if the volume level is above the de-activation threshold for a second defined period of time.

11. The processor readable storage medium of claim 10, wherein when the instructions are executed by the processor they further cause the processor to determine the activation threshold dynamically based on the volume level.

12. The processor readable storage medium of claim 11, wherein when the instructions are executed by the processor they further cause the processor to determine parameters about the volume level and utilize at least a subset of the parameters to dynamically determine the activation threshold.

* * * * *